United States Patent
Vinogradov et al.

(10) Patent No.: US 7,331,524 B2
(45) Date of Patent: Feb. 19, 2008

(54) FEEDBACK MECHANISM FOR SCANNER DEVICES

(75) Inventors: Igor Vinogradov, Bay Shore, NY (US); Vladimir Gurevich, Stony Brook, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 21 days.

(21) Appl. No.: 11/140,867

(22) Filed: May 31, 2005

(65) Prior Publication Data

US 2006/0266840 A1    Nov. 30, 2006

(51) Int. Cl.
G06K 7/10 (2006.01)
G06K 19/06 (2006.01)
G06K 9/22 (2006.01)
G06K 26/10 (2006.01)
G02B 5/08 (2006.01)
G02B 26/00 (2006.01)

(52) U.S. Cl. ............ 235/462.25; 235/473; 235/462.35; 235/462.43

(58) Field of Classification Search ........... 235/462.25, 235/462.43, 462.35, 473
See application file for complete search history.

(56) References Cited

U.S. PATENT DOCUMENTS

| | | | |
|---|---|---|---|
| 3,916,158 A * | 10/1975 | Sansone et al. ........ | 235/462.39 |
| 4,251,798 A | 2/1981 | Swartz et al. | |
| 4,369,361 A | 1/1983 | Swartz et al. | |
| 4,387,297 A | 6/1983 | Swartz et al. | |
| 4,409,470 A | 10/1983 | Shepard et al. | |
| 4,575,623 A * | 3/1986 | Cononi et al. ............... | 235/383 |
| 4,760,248 A | 7/1988 | Swartz et al. | |
| 4,896,026 A | 1/1990 | Krichever et al. | |
| 4,939,356 A * | 7/1990 | Rando et al. ............. | 235/462.2 |
| 5,015,833 A | 5/1991 | Shepard et al. | |
| 5,140,141 A * | 8/1992 | Inagaki et al. ......... | 235/462.43 |
| 5,196,686 A * | 3/1993 | Leister ........................ | 705/23 |
| 5,229,590 A * | 7/1993 | Harden et al. ......... | 235/462.45 |
| 5,262,627 A | 11/1993 | Shepard | |
| 5,504,316 A | 4/1996 | Bridgelall et al. | |
| 5,572,007 A * | 11/1996 | Aragon et al. ......... | 235/462.35 |
| 5,625,483 A | 4/1997 | Swartz | |
| 5,689,104 A * | 11/1997 | Suzuki et al. .......... | 235/462.09 |
| 5,933,539 A * | 8/1999 | Metcalfe et al. ............ | 382/252 |
| 5,959,286 A * | 9/1999 | Dvorkis et al. ............. | 235/470 |
| 5,992,746 A * | 11/1999 | Suzuki ................... | 235/462.21 |
| RE36,528 E * | 1/2000 | Roustaei ................ | 235/472.01 |
| 6,098,887 A * | 8/2000 | Figarella et al. ........ | 235/472.01 |
| 6,105,869 A * | 8/2000 | Scharf et al. ................ | 235/454 |
| 6,123,265 A | 9/2000 | Schlieffers et al. | |
| RE37,166 E * | 5/2001 | Rando et al. .......... | 235/462.36 |
| 6,592,040 B2 | 7/2003 | Barkan et al. | |
| 6,598,797 B2 * | 7/2003 | Lee ........................ | 235/462.22 |
| 6,619,547 B2 * | 9/2003 | Crowther et al. ........... | 235/454 |

(Continued)

*Primary Examiner*—Daniel Walsh
(74) *Attorney, Agent, or Firm*—Tarolli, Sundheim, Covell & Tummino LLP

(57) ABSTRACT

A bar code reader indicator feature gives visible indication that a bar code function has been performed. The feature is integrally molded with the exit window to simplify the design and reduce cost. The feature can diffuse light from an existing indicator light within the reader or the scanning light beam can be directed to impinge upon an area of the exit window not normally in the beam path when the function has been performed to illuminate the feature.

26 Claims, 4 Drawing Sheets

U.S. PATENT DOCUMENTS

| | | | |
|---|---|---|---|
| 6,661,521 B1* | 12/2003 | Stern | 356/446 |
| 6,736,320 B1* | 5/2004 | Crowther et al. | 235/454 |
| 6,811,085 B2* | 11/2004 | Carlson et al. | 235/454 |
| 6,860,428 B1* | 3/2005 | Dowling et al. | 235/462.45 |
| 7,090,137 B1* | 8/2006 | Bennett | 235/472.01 |
| 7,178,732 B1* | 2/2007 | Barron et al. | 235/462.14 |
| 7,207,486 B1* | 4/2007 | Bennett | 235/385 |
| 7,264,166 B2* | 9/2007 | Barkan | 235/462.21 |
| 2001/0032884 A1* | 10/2001 | Ring et al. | 235/454 |
| 2002/0056750 A1* | 5/2002 | Kato et al. | 235/454 |
| 2002/0060247 A1* | 5/2002 | Krishnaswamy et al. | 235/472.01 |
| 2002/0066838 A1* | 6/2002 | Katoh et al. | 248/133 |
| 2002/0148902 A1* | 10/2002 | Schlieffers | 235/472.01 |
| 2002/0170965 A1* | 11/2002 | Crowther et al. | 235/454 |
| 2002/0185542 A1* | 12/2002 | Wilz et al. | 235/462.46 |
| 2003/0001014 A1* | 1/2003 | Kumagai et al. | 235/454 |
| 2003/0201329 A1* | 10/2003 | Kumagai et al. | 235/462.32 |
| 2004/0079804 A1* | 4/2004 | Harding et al. | 235/472.02 |
| 2004/0164156 A1* | 8/2004 | Watanabe et al. | 235/462.15 |
| 2004/0173681 A1* | 9/2004 | Toyama et al. | 235/454 |
| 2005/0023358 A1* | 2/2005 | Byun et al. | 235/462.45 |
| 2005/0103847 A1* | 5/2005 | Zhu et al. | 235/462.07 |
| 2005/0116043 A1* | 6/2005 | Zhu et al. | 235/462.45 |
| 2005/0167504 A1* | 8/2005 | Meier et al. | 235/462.45 |
| 2005/0194446 A1* | 9/2005 | Wiklof et al. | 235/462.46 |
| 2005/0211782 A1* | 9/2005 | Martin et al. | 235/462.45 |
| 2005/0274810 A1* | 12/2005 | Schmidt et al. | 235/462.43 |
| 2005/0279832 A1* | 12/2005 | Kobayashi et al. | 235/462.07 |
| 2005/0284942 A1* | 12/2005 | Gurevich et al. | 235/462.21 |
| 2006/0027659 A1* | 2/2006 | Patel et al. | 235/454 |
| 2006/0043187 A1* | 3/2006 | He et al. | 235/462.2 |
| 2006/0113389 A1* | 6/2006 | Barkan | 235/462.21 |
| 2006/0118626 A1* | 6/2006 | Kricorissian | 235/454 |
| 2006/0151608 A1* | 7/2006 | Kricorissian et al. | 235/462.21 |
| 2006/0169782 A1* | 8/2006 | Schmidt et al. | 235/462.45 |
| 2006/0180670 A1* | 8/2006 | Acosta et al. | 235/462.31 |
| 2006/0266840 A1* | 11/2006 | Vinogradov et al. | 235/462.45 |
| 2007/0040035 A1* | 2/2007 | Kotlarsky et al. | 235/462.45 |

* cited by examiner

FEEDBACK MECHANISM FOR SCANNER DEVICES

TECHNICAL FIELD

The invention relates generally to the filed of optical scanners for bar code reading and more particularly to the feedback mechanisms that inform a scanner use the scanner's beam has been activated.

BACKGROUND

Various optical scanning systems and readers have been developed heretofore for reading indicia, such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like. Scanning systems and readers of this general type have been disclosed for example, in U.S. Pat. Nos. 4,251,798; 4,369,361; 4,387,297; 4,409,470; 4,760,248; 4,896,026; 5,015,833; 5,262,627; 5,504,316; 5,625,483; and 6,123,265, all of which have been assigned to the same assignee as the instant application each of which is hereby incorporated by reference herein in its entirety. As disclosed in some of the above patents, in one embodiment such a scanning system resides, inter alia, in a hand-held portable laser scanning device supported by a user, which is configured to allow the user to aim a scanning head of the device, and more particularly, a light beam, at a targeted symbol to be read.

The light source in a laser scanner bar code reader is typically a semiconductor laser. The use of semiconductor devices as the light source is advantageous because of their small size, low cost and low voltage requirements. The laser beam is optically modified, typically by an optical assembly, to form a beam spot of a certain size at the target distance. The laser light beam is directed by a lens or other optical components along a light path toward a target that includes a bar code symbol on the target surface.

Many types of bar code readers, including hand-held readers, have a user feedback feature that gives a visual or audio indication that the scanner has been activated and/or that the decode is successful. This user feedback feature is often an LED that is illuminated to indicate that the beam is activated or that a decode is successful. The LED may be visible to the user through a window in the reader housing or coupled to a light pipe that directs the light to a location outside of the scanner housing. While providing valuable feedback to a reader user, the LED and light pipe add cost and complexity to the reader.

SUMMARY

By providing an indicator feature that is molded integrally with the exit window, the cost and complexity of a bar code reader can be reduced. A bar code reader that acts upon a bar code on a target surface includes a light source that produces a light beam, a scan engine that directs the light beam through a scanning excursion, an exit window through which the light beam exits the bar code reader, and an indicator feature that is integral to the exit window. The indicator feature provides visible feedback to a user regarding the functioning of the bar code reader, such as when the bar code reader has successfully decoded a bar code or when an error in decoding has occurred.

In most cases, the exit window includes a normal operating portion through which the light beam passes when the bar code reader is acting upon a bar code. The indicator feature may be molded into one or more portions of the exit window outside the normal operating portion such that when the light beam passes through the indicator feature, an image of the indicator feature is projected onto the target surface. In this case a scan engine controller may direct the light beam to pass through the indicator feature when a specified function of the bar code reader has occurred. Alternatively, the indicator feature may be molded at a distal end of a light pipe integrally molded with and projecting from a portion of the exit window outside the normal operating portion. In this case as well, the scan engine controller may direct the light beam to pass through the indicator feature when a specified function of the bar code reader has occurred.

An existing decoder light source that is present, for example, on a circuit board that houses the decoder can be made visible outside the bar code reader through the indicator feature, which is integral with the exit window. For example, the indicator feature can be a diffuser that diffuses light from the decoder light source.

BRIEF DESCRIPTION OF THE DRAWINGS

FIG. 2b is a cross section view of the exit window of FIG. 2a;

DESCRIPTION

Figure 1:
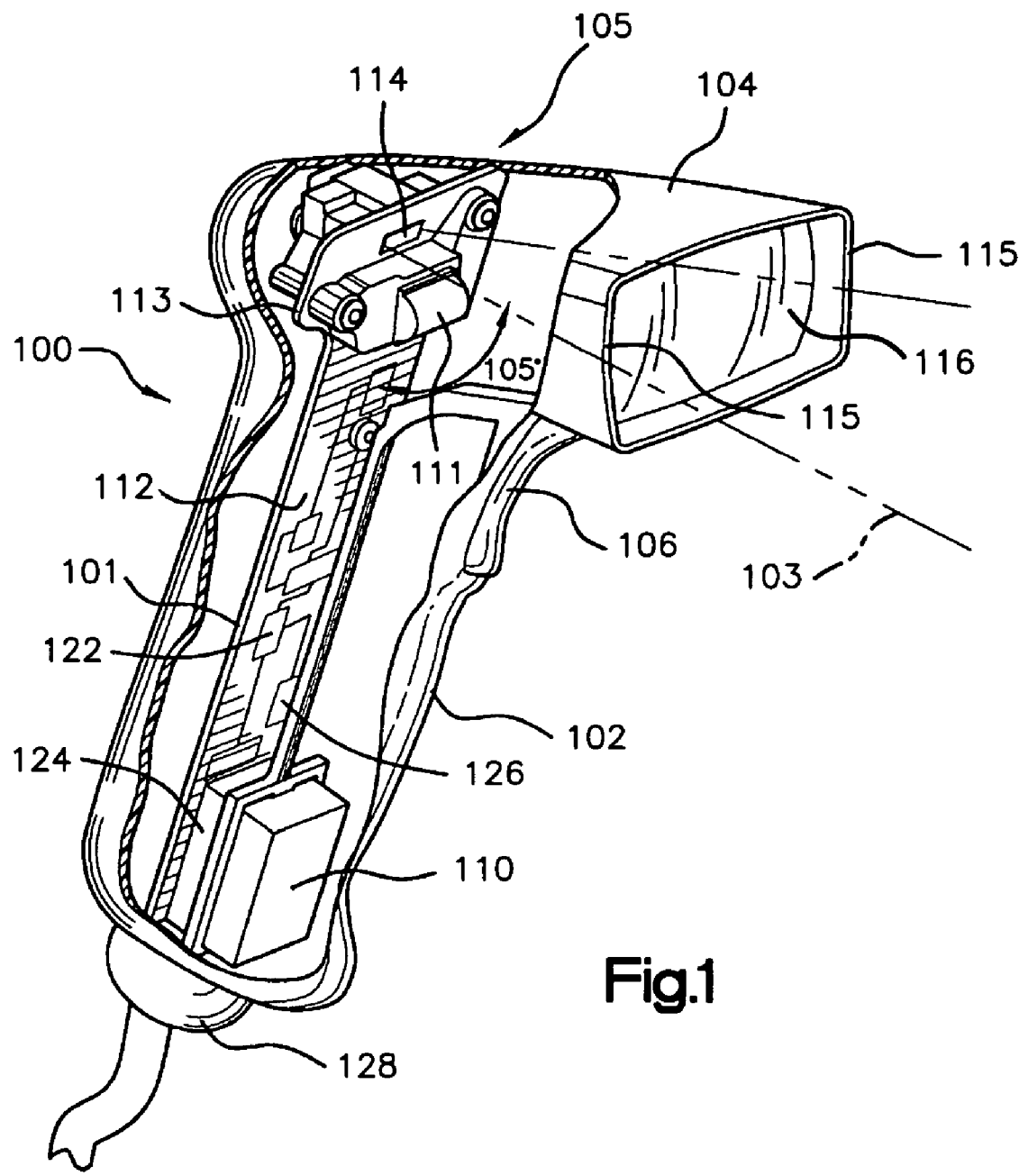
FIG. 1 is cut away of a typical hand-held bar code scanner.

FIG. 1 illustrates a typical hand-held bar code reader 100. The reader includes a printed circuit board 101 that slides into a housing handle 102 in a generally vertical or upright fashion. A housing, shown as a cutaway outline, envelops the circuit board, light source, and other reader components. The housing consists of the handle 102 and a barrel or canopy 104 molded in a fashion similar to that known in the art. The circuit board 101 supports a scan engine 105, a trigger switch 106, and related electronics 122 connected to a controller 124. The scan engine 105 controls components that cause the beam to oscillate back and forth with a controlled amplitude in substantially linear excursion across the exit window. The outgoing laser beam passes through a slot 114 in the circuit board and is clipped by the exit window edges 115 of the housing so it is usable almost to the end of the scan line.

As discussed in the Background, it is common for a reader to provide an audible or visible indication to a user that the reader has been activated. Usually, a separate LED is used to signal activation and light from the LED can be visible through a window or opening in the reader housing or transported via a light pipe to an indicator in the housing. In some cases, the light pipe is overmolded with the housing, which adds cost to the reader. FIGS. 2-4 illustrate visible activation indication features that are incorporated into the exit window, which simplifies the reader design and construction. The exit window is molded from plastic, typically a polycarbonate or acrylic, so that an elongated projection of the exit window material can serve as an optical fiber and transmit light from the exit window to an area visible to the user.

Figure 2A:
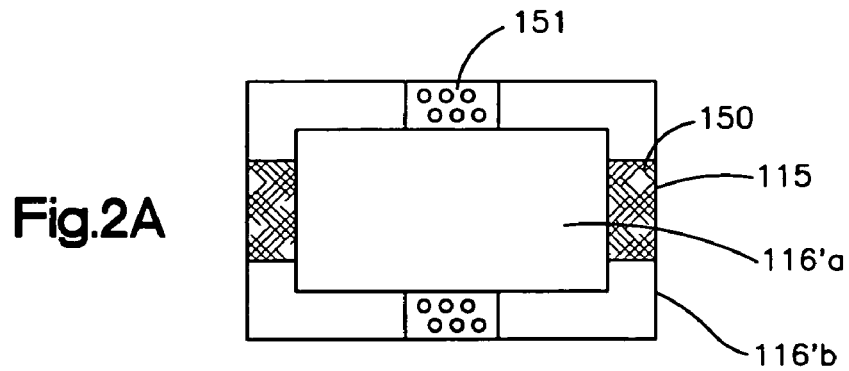
FIG. 2a is a front view of a bar code reader exit window constructed in accordance with one embodiment of the present invention.
Figure 2B:
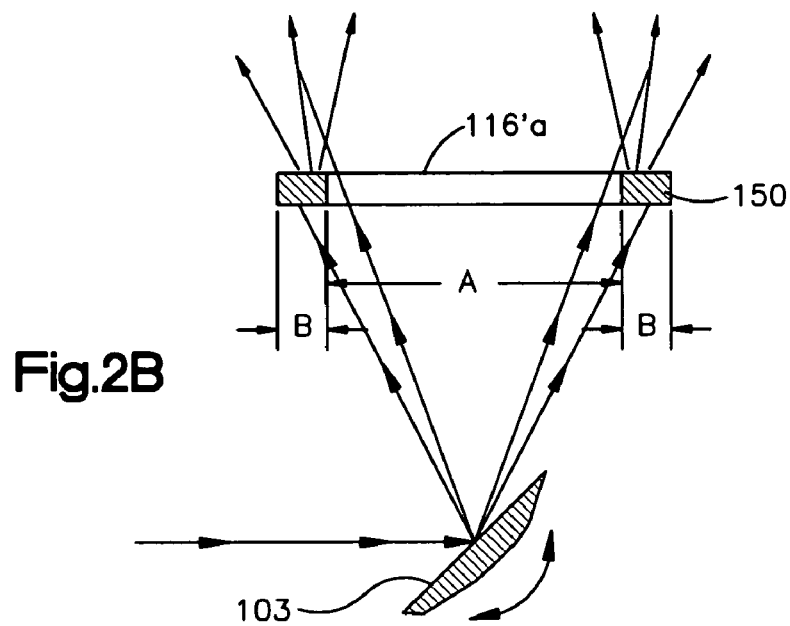
Figure 3:
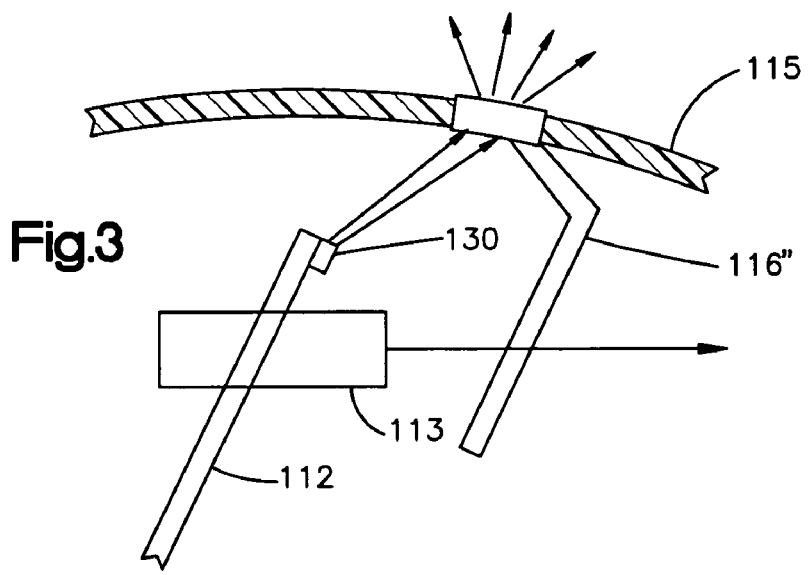
FIG. 3 is a cross section view of a bar code reader exit window constructed in accordance with one embodiment of the present invention.

FIGS. 2a and 2b show an exit window 116' that has been modified from the exit window 116 shown in FIG. 1 to include two pairs of scanner function indicator patterns 150, 151 around a periphery 116'b of the exit window. Referring to FIG. 2b, in normal operation the outgoing laser beam from the scanner passes through the central portion of the exit window "A". The peripheral area "B" at the edges of the exit window is not encountered by the beam during reading of a bar code. In the scanner function indicator pattern area 150 special structure is incorporated into the exit window periphery 116'a so that when the beam passes through the periphery, the beam is modified in a certain way to create an identifiable pattern on the target area. More than one type of identifiable pattern may be used to indicate more than one type of scanner function. For example, the pattern area 150 may be used to indicate a successful decode, while the pattern area 151 may be used to indicate a decode error. To utilize this successful decode indication feature, when a successful decode is achieved, the scan engine 105 is actuated to direct the outgoing beam through the appropriate scanner function indicator pattern area 150 to illuminate the special structure. The beam may be held in this position so that the feature is continuously illuminated or the amplitude of oscillation may be increased so that on each pass of the beam after a successful decode the feature is illuminated. Alternatively, the scan engine can direct the beam through several scanner function indicator patterns can in series to create a series of images on the target surface.

The scanner function indicator pattern on the exit window can be created in many ways. By nature it can be a diffractive or refractive type of structure. The pattern can be advantageously molded such that the structure is incorporated directly on the surface of the window at little or no additional cost. A diffractive structure may generate a pattern including letters, words, logos, and pictures, such as a company logo or a check mark. While easier to manufacture, a refractive structure may be limited to simpler patterns such as lines, crosses, and dots.

FIG. 3 shows a modified exit window 116" that incorporates an integral decode indicating light diffuser 121 that projects to the housing from the top edge of the exit window. The diffuser 121 is positioned such that light from the successful decode indicator LED 130 on the top of the circuit board 112 passes through the diffuser and is made visible to the user. The LED is illuminated to indicate a successful decode and/or activation of the beam. The diffuser directs the LED's light to the user. The bottom surface of the diffuser may include surface features that better distribute light toward the user.

Figure 4A:
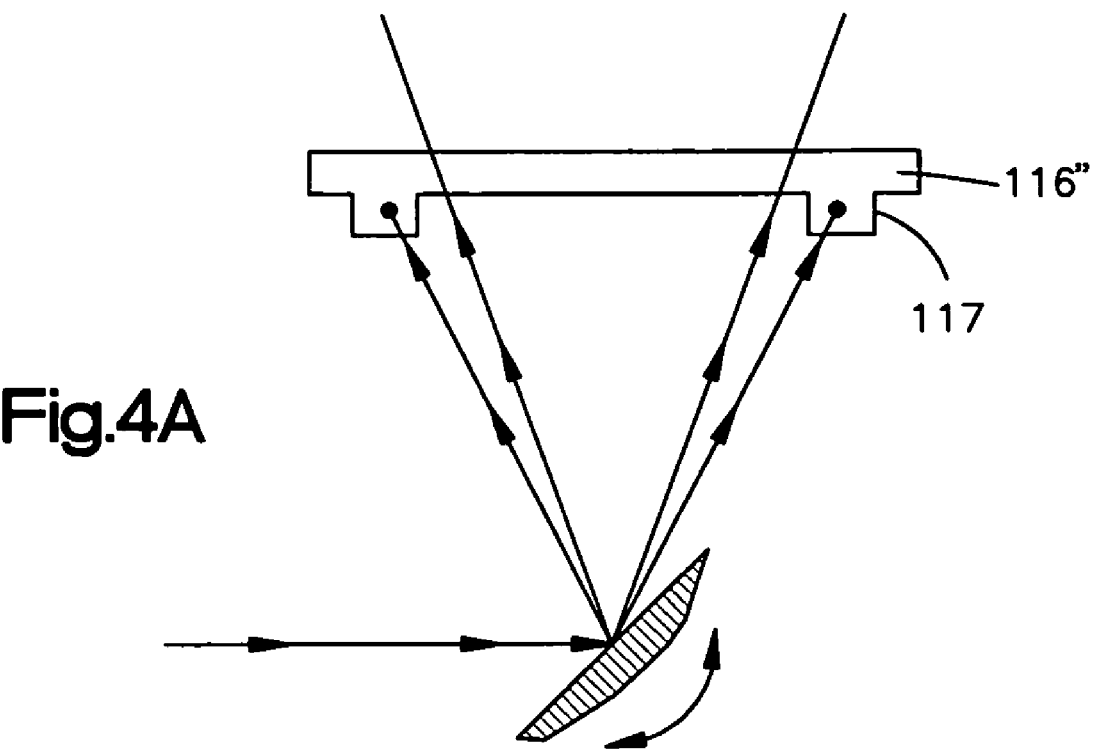
FIGS. 4a and 4b are cross section views of a bar code reader exit window constructed in accordance with one embodiment of the present invention.
Figure 4B:
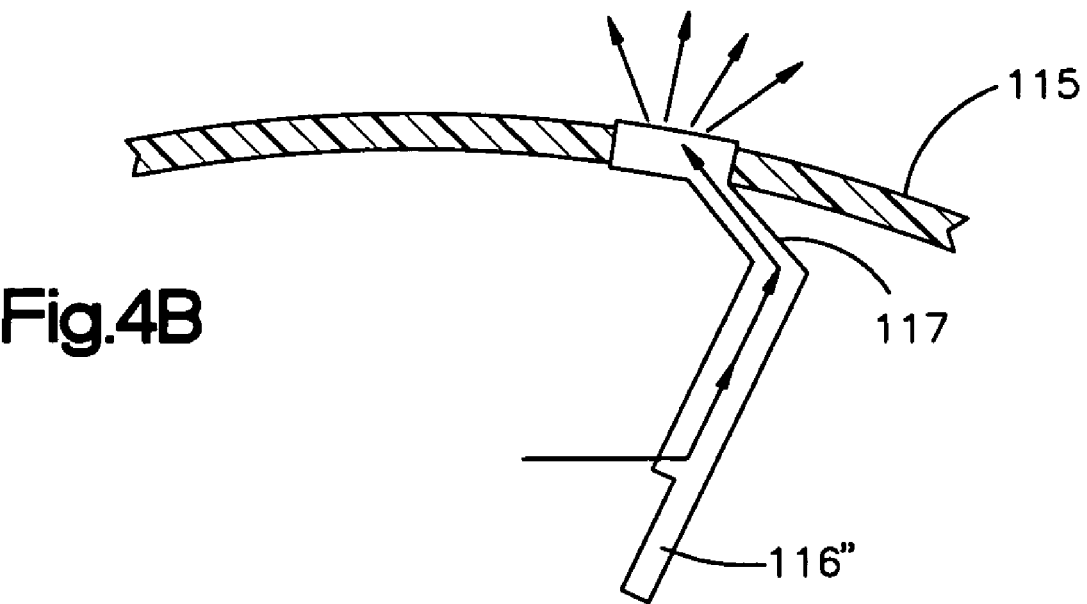

FIG. 4a shows an exit window 116''' that has an integral light pipe 117 molded at one of its edges outside the scanning area. As with the modified exit window 116', this decode indicator utilizes light from the beam itself as it passes through the periphery of the exit window to provide visible feedback to the user when a successful decode is achieved. When a decode is complete, the scan engine causes the laser beam to pass through the peripheral area. When the laser beam enters the light pipe it is guided outside the reader housing as shown in FIG. 4b. The laser beam can be held stationary at the periphery to maintain constant illumination via the light pipe or the laser beam's oscillation may be increased in amplitude so that on each pass the beam is routed through the light pipe.

Figure 5:
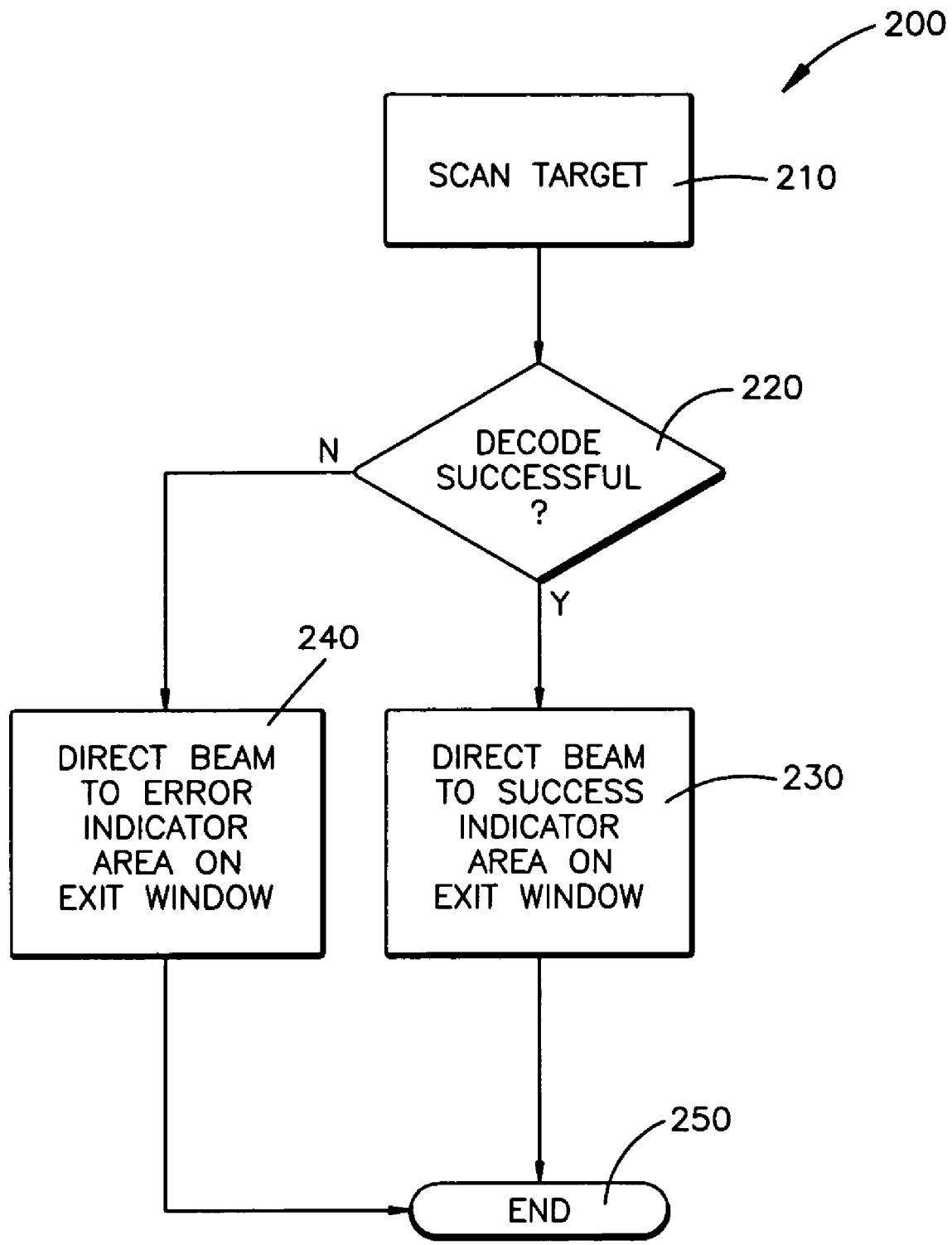
FIG. 5 is a flowchart outlining a method of providing user feedback in accordance with one embodiment of the present invention.

FIG. 5 is a flowchart outlining a method 200 for providing feedback regarding scanner function, in this case a successful decode or a decode error. At 210 the scan engine directs the beam through the normal scanning area of the exit window. At 220 the scan engine receives a signal indicative of whether the decode was successful or not. If the decode was successful, the scan engine directs the beam to a success indicator area on the exit window (230). If a decode error has occurred, the scan engine directs the beam to an error indicator area on the exit window (240).

As can be seen from the foregoing description, incorporating scanner function indication features into the exit window of a bar code reader can simplify the design and construction of the reader. While multiple embodiments of the invention have been illustrated and described in detail, the present invention is not to be considered limited to the precise constructions disclosed. Various modifications, adaptations and uses of the invention may occur to those skilled in the art to which the invention relates. The intention is to cover all such modifications, adaptations and uses falling within the spirit or scope of the claims.

We claim:

1. A bar code reader that acts upon a bar code on a target surface comprising:
    a light source that produces a light beam;
    a scan engine that directs the light beam through a scanning excursion;
    an exit window including a normal operating portion through which the light beam exits the bar code reader when the reader is acting upon a bar code; and
    an indicator feature that is integral to the exit window and outside of the normal operating portion such that when the light beam passes through the indicator feature, an image of the indicator feature is projected onto the target surface to provide visible feedback to a user in the form of an identifiable pattern on the target surface regarding the functioning of the bar code reader with respect to indicating a result of an attempted decoding of the bar code being acted upon, the indicator feature having an optical structure different than an optical structure of the normal operating portion of the exit window.

2. The bar code reader of claim 1 wherein the indicator feature provides visible feedback to a user that the bar code reader has decoded the bar code.

3. The bar code reader of claim 1 wherein the indicator feature provides visible feedback to a user that a reader error has occurred.

4. The bar code reader of claim 1 wherein the exit window includes a normal operating portion through which the light beam passes when the bar code reader is acting upon a bar code and wherein one or more indicator features are molded into one or more portions of the exit window outside the normal operating portion such that when the light beam passes through an indicator feature, an image of the indicator feature is projected onto the target surface.

5. The bar code reader of claim 4 comprising a scan engine controller that causes the scan engine to direct the light beam to pass through the indicator feature when a specified function of the bar code reader has occurred.

6. The bar code reader of claim 1 wherein the exit window includes a normal operating portion through which the light beam passes when the bar code reader is acting upon a bar code and wherein the indicator feature comprises a molded feature at a distal end of a light pipe integrally molded with and projecting from a portion of the exit window outside the normal operating portion.

7. The bar code reader of claim 6 comprising a scan engine controller that causes the scan engine to direct the light beam to pass through the indicator feature when a specified function of the bar code reader has occurred.

8. The bar code reader of claim 1 comprising a decoder that processes signals indicative of levels of light reflected back from the bar code and illuminates a decoder light source when signals have been successfully decoded and wherein light from the decoder light source is transmitted outside the bar code reader through the indicator feature.

9. The bar code reader of claim 8 wherein the indicator feature is a difusser that diffuses light from the decoder light source.

10. The bar code reader of claim 1 wherein indicator feature has a diffractive optical structure.

11. The bar code reader of claim 1 wherein the indicator feature has a refractive optical structure.

12. A method that indicates an occurrence of one or more function events of a bar code reader having an exit window through which a scanning light beam passes comprising;
providing an exit window including a normal operating portion through which the light beam exits the bar code reader when the reader is acting upon a bar code and an indicator that is integral to the exit window and outside of the normal operating portion such that when the light beam passes through the indicator feature, an image of the indicator feature is projected onto the target surface to provide feedback to a user of the bar code reader in the form of an identifiable pattern on a target surface regarding the functioning of the bar code reader with respect to indicating a result of attempted decoding of the bar code being acted upon, the indicator feature having an optical structure different than an optical structure of the normal operating portion of the exit window;
determining that a bar code reader function event has occurred; and
directing light through the indicator feature.

13. The method of claim 12 wherein the bar code reader event is successful decode of a bar code upon which the scanning light beam is acting.

14. The method of claim 12 wherein the bar code reader event is an error in the decoding of a bar code which the scanning light beam is acting.

15. The method of claim 12 wherein the exit window includes a normal operating portion through which the light beam passes when the bar code reader is acting upon a bar code and wherein the indicator feature is provided by molding one or more indicator features into one or more portions of the exit window outside the normal operating portion such that when the light beam passes through an indicator feature, an image of the indicator feature is projected onto the target surface.

16. The method of claim 15 comprising directing the scanning light beam through a corresponding indicator feature when the bar code reader function event occurs.

17. The method of claim 16 comprising directing the scanning light beam through more than one indicator feature in series when the bar code reader function event occurs.

18. The method of claim 12 wherein the exit window includes a normal operating portion through which the light beam passes when the bar code reader is acting upon a bar code and wherein the indicator feature is provided by molding a light pipe integrally with a portion of the exit window outside the normal operating portion and wherein the indicator feature is located at a distal end of the light pipe that projects outside the reader.

19. The method of claim 18 comprising directing the scanning light beam through the indicator feature when the bar code reader function event occurs.

20. The method of claim 12 wherein the indicator feature is provided by molding the indicator feature onto a projection from the exit window such that the indicator feature protrudes outside the bar code reader.

21. The method of claim 20 comprising illuminating a bar code reader function event light source when it is determined that the bar code reader function event has occurred and wherein light from the bar code reader function event light source is diffused outside the bar code reader by the indicator feature.

22. Apparatus for indicating an occurrence of one or more function events of a bar code reader having an exit window through which a scanning light beam passes comprising;
indicator means including an exit window having a normal operating portion through which the light beam exits the bar code reader when the reader is acting upon a bar code and an indicator feature that is integral to the exit window and outside of the normal operating portion such that when the light beam passes through the indicator feature, an image of the indicator feature is projected onto the target surface to provide visible feedback to a user of the bar code reader in the form of an identifiable pattern on a target surface regarding functioning of the bar code reader with respect to indicating a result of an attempted decoding of the bar code being acted upon, the indicator feature having an optical structure different than an optical structure of the normal operating portion of the exit window;
means for determining that a bar code reader function event has
occurred; and
means for directing light through the indicator means when the bar code reader function event has occurred.

23. Computer storage media having computer-executable instructions stored thereon for performing method steps that indicate an occurrence of one or more function events of a bar code reader having an exit window through which a scanning light beam passes and one or more indicator features that are integrally molded with the exit window, the steps comprising;
determining that a bar code reader function event has occurred;
providing exit window including a normal operating portion through which the light beam exits the bar code reader when the reader is acting upon a bar code and an indicator feature that is integral to the exit window and outside of the normal operating portion such that when the light beam passes through the indicator feature, an image of the indicator feature is projected onto the target surface, the indicator feature having an optical structure different than an optical structure of the normal operating portion of the exit window; and
directing the scanning light beam through the indicator feature, the indicator feature providing visible feedback to a user of the bar code reader in the form of an identifiable pattern on a target surface regarding the functioning of the bar code reader with respect to indicating a result of an attempted decoding of the bar code being acted upon.

24. The computer storage media of claim 23 wherein the exit window includes a normal operating portion through which the light beam passes when the bar code reader is acting upon a bar code and wherein the indicator feature is provided by molding one or more indicator features into one or more portions of the exit window outside the normal operating portion such that when the light beam passes through an indicator feature, an image of the indicator feature is projected onto the target surface and wherein the computer-executable instructions include the step of directing the scanning light beam through a corresponding indicator feature when the bar code reader function event occurs.

25. The computer storage media of claim 24 wherein the computer-executable instructions include the step of directing the scanning light beam through more than one indicator feature in series when the bar code reader function event occurs.

26. The computer storage media of claim 23 wherein the exit window includes a normal operating portion through which the light beam passes when the bar code reader is acting upon a bar code and wherein the indicator feature is provided by molding a light pipe integrally with a portion of the exit window outside the normal operating portion and wherein the indicator feature is located at a distal end of the light pipe that projects outside the reader and wherein the computer-executable instructions include the step of directing the scanning light beam through the indicator feature when the bar code reader function event occurs.

* * * * *

UNITED STATES PATENT AND TRADEMARK OFFICE
CERTIFICATE OF CORRECTION

PATENT NO. : 7,331,524 B2  Page 1 of 1
APPLICATION NO. : 11/140867
DATED : February 19, 2008
INVENTOR(S) : Vinogradov et al.

It is certified that error appears in the above-identified patent and that said Letters Patent is hereby corrected as shown below:

In Column 1, Line 8, delete "use" and insert -- user that --, therefor.

In Column 5, Line 25, in Claim 9, delete "difusser" and insert -- diffuser --, therefor.

In Column 5, Line 32, in Claim 12, delete "comprising;" and insert -- comprising: --, therefor.

In Column 5, Line 36, in Claim 12, after "indicator" insert -- feature --.

In Column 6, Line 24, in Claim 22, insert -- An --, before "Apparatus".

In Column 6, Line 26, in Claim 22, delete "comprising;" and insert -- comprising: --, therefor.

In Column 6, Line 46, in Claim 23, insert -- A --, before "Computer".

In Column 6, Line 52, in Claim 23, delete "comprising;" and insert -- comprising: --, therefor.

In Column 6, Line 55, in Claim 23, after "providing" insert -- an --.

Signed and Sealed this

Twenty-second Day of December, 2009

David J. Kappos
*Director of the United States Patent and Trademark Office*